Dec. 21, 1937.   N. E. SQUIRE   2,103,190
DRIVE MECHANISM
Filed Jan. 18, 1937   2 Sheets-Sheet 1
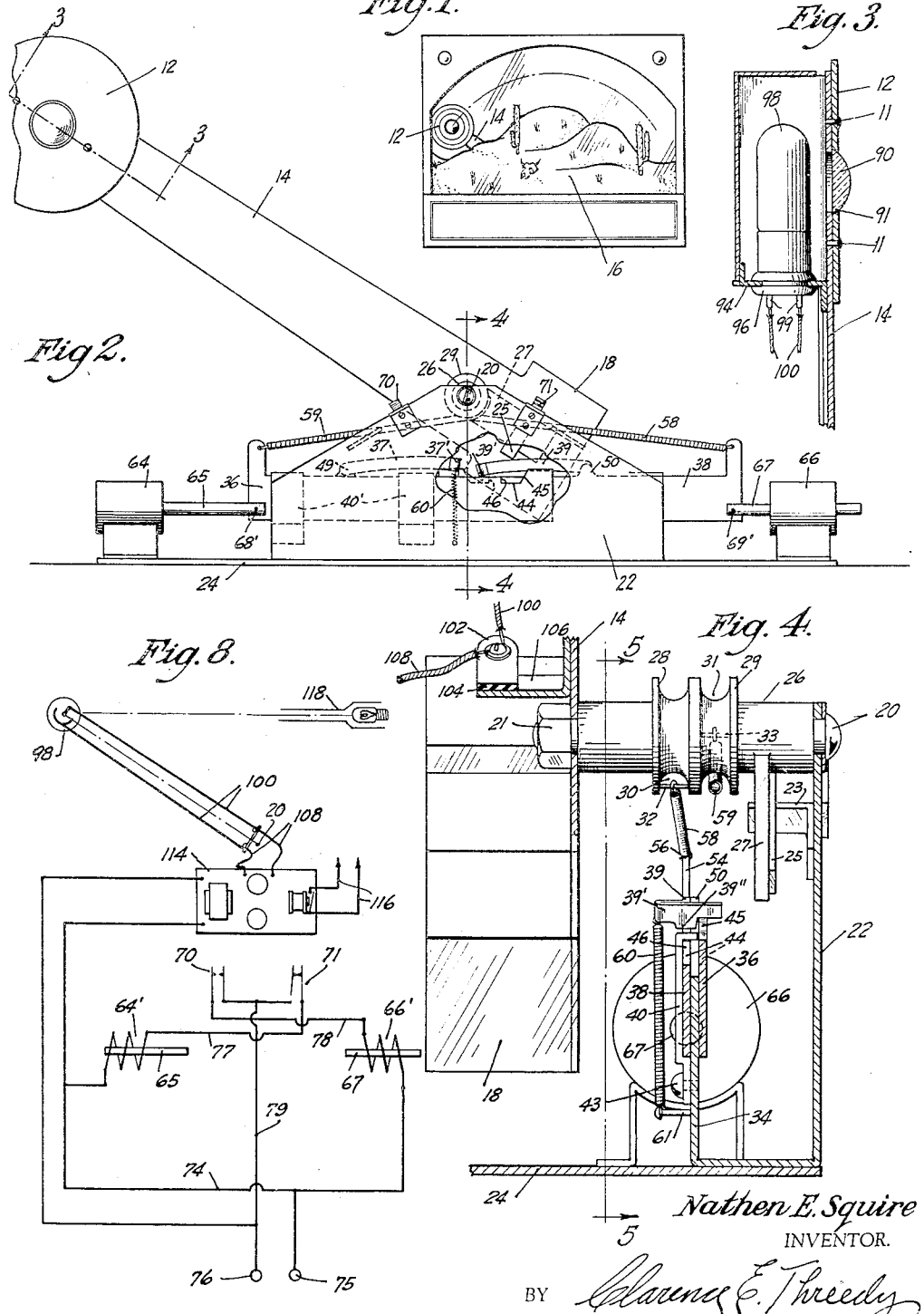
Nathen E. Squire
INVENTOR.
BY Clarence E. Threedy
HIS ATTORNEY.

Dec. 21, 1937.   N. E. SQUIRE   2,103,190
DRIVE MECHANISM
Filed Jan. 18, 1937   2 Sheets-Sheet 2
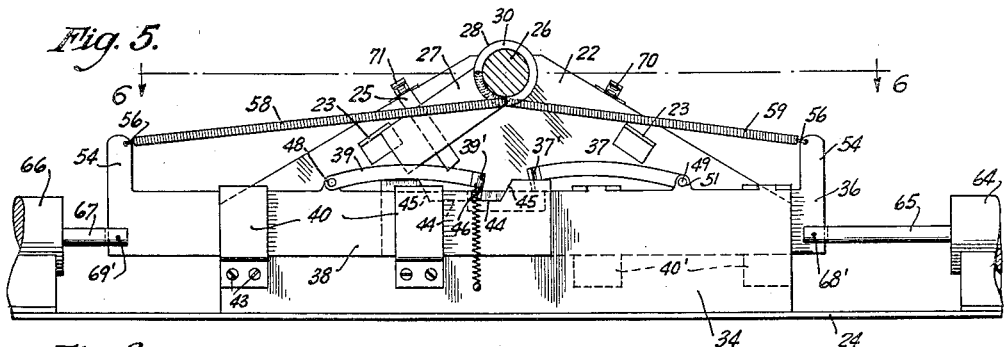
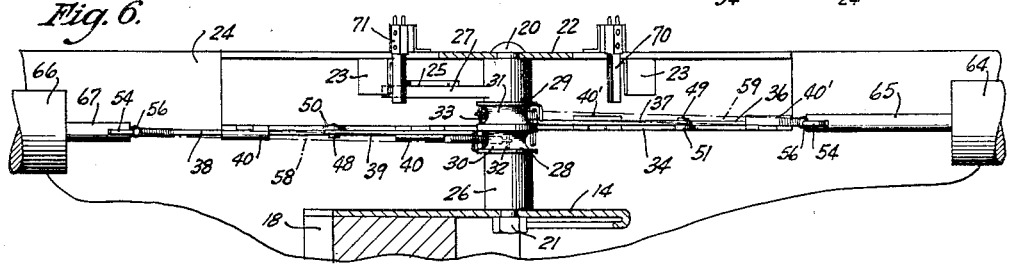
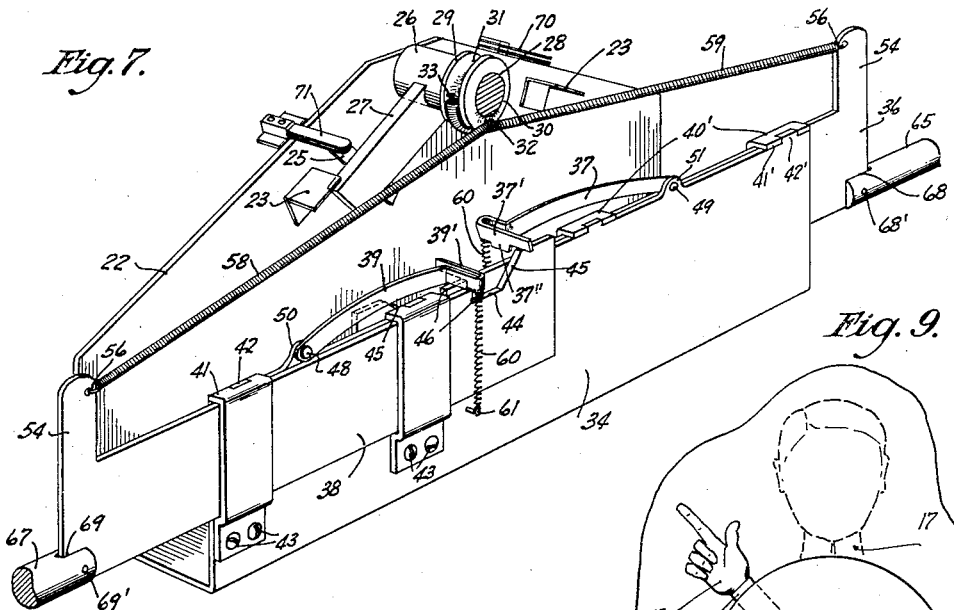
Nathen E. Squire
INVENTOR.
BY Clarence E. Threedy
HIS ATTORNEY.

Patented Dec. 21, 1937

2,103,190

UNITED STATES PATENT OFFICE 2,103,190

DRIVE MECHANISM

Nathen E. Squire, Chicago, Ill.

Application January 18, 1937, Serial No. 121,075

11 Claims. (Cl. 172—126)

This invention relates to improvements in drive mechanism, and especially to a novel form of electro-mechanical drive adapted to impart an oscillating movement to advertising devices, targets, and the like.

Among the important objects of the invention is the provision of a novel mechanical movement which is simple, inexpensive, and rugged in construction, and which is adapted to produce a source of oscillatory driving power of fairly constant amplitude and period and suited for regular back and forth movement of the moving element of an advertising or display device, or the periodic motion of a target member in an electric shooting gallery or the like.

A further and specific object is the provision of an oscillatory drive mechanism including a frame, a pair of slide arms oppositely disposed on the frame for alternate reciprocatory motion, an oscillating arm, switch means operable intermittently by oscillation of said arm, springs attached to the oscillating arm and to each of the slide arms and adapted to urge the same in a direction toward one another, electro-magnetic means operable intermittently by the switch means to move one of the slide arms in a direction away from the other to tension one of the springs, and latch mechanism operable to latch a slide arm in spring tensioning position and means on each of the slide arms for unlatching the other, which has previously been tensioned, upon every operation of the electro-magnetic means.

Other novel aspects and objects of the invention will appear as the following description proceeds in view of the annexed drawings, in which:

Fig. 1 is a front elevation of a target device utilizing the invention;

Fig. 2 is an enlarged front elevation of the drive mechanism and a target driven thereby;

Fig. 3 is an enlarged vertical section of the target proper, viewed from the side and taken along lines 3—3 of Fig. 2;

Fig. 4 is an enlarged side elevation partly in section of the lower end of the target pendulum, and taken along lines 4—4 of Fig. 2;

Fig. 5 is an enlarged rear elevation of the drive mechanism of Fig. 2 and taken in the direction of lines 5—5 of Fig. 4;

Fig. 6 is a top plan view partly in section of the drive mechanism, and taken in the direction of lines 6—6 of Fig. 5 in which the springs 58 and 59 are shown broken away between their respective end portions;

Fig. 7 is an enlarged perspective of the drive mechanism viewed from the rear;

Fig. 8 is a circuit diagram; while

Fig. 9 illustrates another application of the drive mechanism as employed with an advertising device.

The present invention contemplates the provision of a simple electro-mechanical device suitable for producing oscillating or to and fro movement which may be utilized to drive a wide variety of mechanisms, and which for purposes of illustration has been shown herein in conjunction with a target device such as seen in Fig. 1, in which a target member 12 attached at the upper end of a pendulum arm 14, moves back and forth before the vision of the marksman above a scenic background 16. Similarly, as in Fig. 9, the drive mechanism is employed with an advertising device which may include a moving hand 13 at the upper extremity of a pendulum arm 15 and which moves back and forth appropriately relative to a human figure 17.

At its lower extremity the target arm 14 is provided with a counter-weight 18 adapted to balance the weight of the target structure 12, the arm being pivotally mounted as at 20 upon an upstanding and somewhat triangularly-shaped wall 22 secured to a base member 24. The pivotal mounting of the arm 14 is effected through a laterally extending sleeve stud 26 through which the pivot bolt 20 extends and which is secured against removal from the same by means of a nut 21. The stud 26 is provided intermediate its extremities with a pair of grooved collars 28 and 29, each having spring tracks or grooves 30 and 31, and each provided with spring mounting pins 32 and 33 extended in an axial direction between the inner peripheral wall portions of the spring grooves.

The base 24 is provided with a rear wall 34 (Fig. 7) disposed opposite to the front wall 22, and provided with a pair of elongated slide arms 36 and 38 reciprocably movable toward one another and attached to the rear wall portion 34 by means of offset brackets 40, each having an upset end portion 41 having a groove or slot into which is received a tongue or lug 42 formed on the upper edge of the wall, the lower and opposite ends of each of the brackets 40 being attached to the wall by means of screws 43 or the like threaded into the wall. It will be observed that one pair of brackets 40 is disposed on one side of the wall 34, while another pair 40' supporting the arm 38 is disposed on the opposite side of the rear wall but in a manner otherwise identical to the first-mentioned pair.

Adjacent its forward upper edge portion, each slide arm 36 and 38 is provided with a notch 44 having a cam edge 45 and an abutment edge 46 disposed oppositely of the cam edge.

Two latch arms 37 and 39 are pivotally attached, as at 48 and 49, to co-extensive lugs 50 and 51 on the upper edge of the rear wall 34. The latch arms are desirably arcuate and have their free end portions bent back upon themselves to form a lateral latch-head 37' and 39', respectively, each of which has a depending latch lug or lip 37'' and 39'' (Fig. 7) against which the latching edges 46 of each of the slide arms respectively are adapted to abut when a corresponding slide arm is in retracted position, as represented by the condition of the arm 37 in Fig. 5, where the slide arm 38 has been retracted to an extreme position toward the left.

Each of the slide arms 36 and 38 is provided with an upstanding arm 54 along the upper and outer edge portion thereof, and each of these arms has attached thereto, as at 56, one extremity of pivot arm return means or springs 58 or 59, the opposite extremities of these springs being respectively connected to the spring pins 32 and 33 on the sleeve stud of the pivot arm. Thus, when either of the arms 36 or 38 is retracted towards its extreme outermost position, the corresponding spring 59 or 58 will be tensioned in a manner to urge the arm in a direction back toward the other. However, the latch arms 37 and 39 are each normally urged by their own weight, and also by means of springs 60 attached thereto and anchored to the rear wall as at 61, downwardly so as to position their respective latching lips 37'' or 39'' in lowered position for abutment with the corresponding latching edge 46 of the slide arm, thereby preventing a return movement of the arm by its tensioned return spring.

Each of the arms 36 and 38 is provided with a retracting device in the form of solenoids 64 and 66 (Figs. 2 and 7), each having a plunger or armature 65 and 67 having a bifurcated outer end portion 68 or 69 into which the opposite lower corner portions of each of the slide arms 36 and 38 are received respectively for pivotal attachment to the armatures by means of pins 68' and 69'. The energization of either of the solenoids will cause its corresponding slide arm to be moved outwardly of the support or frame against the tension of a corresponding return spring, in which retracted position the arms will be latched by their respective latch members.

As seen in Fig. 7 particularly, the sleeve stud 26 is provided with a depending stop arm 27 engageable with either one of a pair of stopping brackets 23 attached to the inner side of the front wall 22 of the frame at the opposite extremes of the swing of the pendulum, and the stop arm 27 in turn is provided with a laterally extending switch arm 25, the outer end portions of which are respectively engageable with one of two leaf spring switches 70 or 71 positioned adjacent one of the stopping brackets 23 at the opposite terminal positions of the stop arm 27 and the switch arm 25 carried thereby, in such manner that the switches 70 and 71 will be alternately operated as the pivot or pendulum arm swings back and forth.

In the illustrative embodiment of Figs. 1 and 2, I have provided a target structure especially suitable for use with electric marksmanship devices having a target provided with photo-electric means for controlling a score indicating signal mechanism adapted to be actuated by a properly directed flash from a light gun. To this end, the target disc 12 of Fig. 2 is provided with a bull's eye opening in which may be seated a light collecting lens 90 having its peripheral edge portions 91 seated in a groove formed between the target arm 14 and the target member 12, the latter being secured against the former by means such as the rivets 11. Behind the target 12 on the arm 14 is a bracket 94 supporting a socket device 96 in which is seated a photo-electric cell 98. Socket terminals 99 are connected to a pair of flexible conductors 100 which extend downwardly behind the pendulum or pivot arm 14 for attachment at their lower extremities to one of two contact lugs 102 mounted on insulation 104 on bracket 106 attached to the pendulum arm (Fig. 4). Thus electrical connection may be established with the moving photo-cell 98 by means of flexible conductors 108 attached to one of each of the connecting lugs 102.

In the operation of the device (referring conveniently to the several figures and especially to the circuit diagram of Fig. 8), the solenoids have their respective windings 64' and 66' joined by conductor 74 with one side 75 of a power line, and each winding being connected respectively by conductors 77 and 78 to one side of switches 70 and 71, the other side of each of these switches being connected in common with a conductor 79 which, in turn, is connected with the other side 80 of the power line. The photo-electric device 98 is connected through the flexible conductors 100 and 108 to the input of an amplifier 114, the output of this amplifier being connected by conductors 116 to a suitable signalling device.

The closing of the switch 71 in Fig. 8, will energize the winding 64' of solenoid 64 and cause the latter to attract its armature 65 and thus retract the corresponding slide arm 36 (Fig. 2) toward the left so as to tension the return spring 59, and as the arm 36 reaches the limit of its outward or retractive movement, the latch arm 37 will be urged by its spring 60 downwardly into the notch 44 in the arm and the return movement of the latter under urgence of its spring 59 will be prevented by the abutment of the latch edge 46 of the notch against the depending lip 37'' of the latch-head 37'.

Meanwhile, the tensioned return spring 59 through its connection to the pendulum stud 26 by means of pin 33, urges the pendulum or target arm and its depending stop arm 27 into an opposite position to that seen in Figs. 5 and 7, and as soon as the switch arm 25 operates the corresponding switch 70 the solenoid winding 66' will be energized and the opposite slide arm 38 will be retracted and its spring 58 likewise tensioned to urge the pendulum into the position seen in Fig. 7 in a direction back toward the switch 71.

However, as the arm 38 approaches the limit of its stroke, its cam edge 45 bears against the latch-head 37' of latch arm 37 and raises the latter to free the arm 36 for return to normal position under the urgence of its spring 59, the slide arm 38 meanwhile having itself become latched and the pendulum arm having started back on its return journey after operation of the switch 71, whereupon the solenoid winding 64' will again be energized to retract the arm 36, and as the latter approaches fully retracted position the latch arm 39 will be raised to free the arm 38 for return movement to its normal position, at which juncture the pendulum will swing back to cause the switch arm 25 again to engage and operate the switch 70.

In this manner the pendulum arm swings back and forth and the slide arms 36 and 38 reciprocate cooperably with the return springs and solenoids to impart a swing of definite amplitude and period to the pendulum 14, if the device of Figs. 1 and 2 is operated by the novel drive mechanism, or to the arm 15 to move the pointing hand 13 in the device of Fig. 9.

In the case of the target mechanism, if the marksman properly directs a ray of light from a light gun 118 (Fig. 8) onto the photo-cell 98 through the target lens 90, the amplifier input will be impulsed by a circuit through conductors 100 and 108 to operate a relay or the like in the output circuit thereof for impulsing a suitable signal or indicator by a circuit through conductors 116.

While I have described in detail a preferred embodiment of the invention in conjunction with a target mechanism, I have also suggested and illustrated the wider application and usefulness of the invention, and I do not desire to be limited to specific details but wish to avail myself of all of the modifications, variations and combinations of the novel drive mechanism and device defined by the appended claims.

Having thus described my invention, what I claim as new and desire to protect by Letters Patent is:

1. An electro-mechanical drive mechanism including a pendulum, switch means operable by the pendulum as it approaches the opposite limits of its oscillatory movement, a pair of oppositely disposed and reciprocable slide arms each having spring means connected with said pendulum and operable when a said arm is moved into retracted position to impart pivotal movement to the pendulum and also to urge the said slide arm out of retracted position, releasable latch means for each of said slide arms and operable to latch the same in retracted position, electro-magnetic means operable by the aforesaid switch means to move one of said slide arms into retracted position for each reversal of the pendulum's swing, each said slide arm being operable as it is moved into retracted position to unlatch the opposite arm from retracted position.

2. An electro-mechanical drive mechanism including a support, a pair of slide arms on said support and disposed for opposite reciprocatory motion, a pendulum arm on said support and having switch operating means, switch means on said support and periodically operable by said switch operating means as said pendulum oscillates, spring means attached to said pendulum and to each of said slide arms and adapted to be tensioned by retraction of one or the other of the arms to urge the retracted one of said arms in a direction toward the other and to urge said pendulum toward one limit of its oscillatory movement, electro-magnetic means for each of said arms and energizable by said switch means to alternately retract one of said arms in a direction away from the other and tension said spring means, releasable latch means operable to latch said arms in retracted position and releasable automatically to free a retracted one of said arms when the other arm is moved into retracted position, whereby said pendulum may be caused to swing back and forth.

3. An oscillating drive mechanism including a pendulum having a depending operating arm with switch operating means thereon, switch means disposed at the opposite limits of the pendulum's swing and operable by said switch operating means once for each reversal of movement of the pendulum, a pair of slide arms disposed for reciprocable movement toward and away from one another and each connected by spring means with said pendulum, each of said arms being movable into retracted position to tension its corresponding said spring means so that the latter will tend to urge said pendulum into pivotal movement, releasable means for latching each of said arms in retracted position, independent electrically operable means for moving each of said arms into retracted position and operable alternately by the aforesaid switch means as said pendulum swings back and forth, and each of said slide arms having means cooperable with the aforesaid latch means of the other said arm, when the first said arm is moved into retracted position, to unlatch the second-mentioned and other arm for movement out of retracted position by its corresponding said spring means.

4. A drive mechanism including a support having upstanding front and back wall portions, an elongated arm pivotally mounted on said front wall portion and having counterweight means disposed adjacent its lower end, said arm further having a depending stop member with a laterally extending switch-operating member thereon, stopping members on opposite sides of the pivotal axis of said elongated arm and engageable by said stop arm to limit the swing of the same in both directions, switch means positioned adjacent said stop members for engagement by said laterally extending switch operating member as said pivoted arm approaches the limit of swing in each direction, a pair of opposite reciprocable slide arms on said rear wall and each having a notched portion provided with a cam edge and engageable by latch means, each of said arms having a latch member pivotally mounted on said rear wall and normally urged into the corresponding notch portion of its said arm when the latter is moved into retracted position, and each said latch arm being engageable for movement out of latching position by the cam edge in the notched portion of the opposite said arm when the latter is moved into retracted position, a pair of divergent spring members attached to said elongated arm at a point adjacent the pivotal mounting of the same and at their respective opposite extremities to said slide arms, the latter being movable into retracted position to tension said spring members, and electro-magnetic means for each of said slide arms and adapted to be energized by the operation of said switch means to move said slide arms sequentially into retracted position.

5. Drive mechanism comprising a pendulum, a pair of oppositely extended spring members attached to said pendulum and adapted when tensioned to urge the pendulum in opposite directions, a pair of oppositely reciprocable operating arms each having one of said spring members attached thereto and each being movable in a direction away from the other to tension said spring members, automatic latch mechanism for holding said arms in retracted position and operable to release a retracted arm when the opposite arm is retracted, an electrical retracting device for each of said arms, and switch means operable by said pendulum to energize each of said electrical devices once during each cycle of swing of the pendulum.

6. Electro-mechanical drive mechanism comprising a pendulum having attached thereto a pair of oppositely extended springs adapted when tensioned to pivot said pendulum in opposite directions, and means for alternately tensioning said springs, said means including a pair of oppositely reciprocable members each attached to one of said springs and each movable into a retracted position to tension its corresponding spring, automatic latch means cooperable with said arms to latch the same in retracted position, each of said arms being effective as it is moved into retracted position to unlatch the other arm of the pair, together with electrical means including switch mechanism therefor operable by said pendulum twice during each swinging cycle thereof for alternately moving said arms into retracted position.

7. Drive mechanism including a pendulum, switch means operable by said pendulum with each reversal of its swing, a pair of operating arms disposed for reciprocable movement relative to one another, electrical means for moving said operating arms independently into a retracted position, and each of said arms having releasable latch means for holding the same in retracted position, the latch means of one of said arms in retracted position being automatically released by the other said arm when the latter moves to retracted position, each of said arms having a yieldable tension device connected to said pendulum and operable when a said arm is retracted to move the pendulum in reverse directions, said electrical means being operable by said switch means to retract first one and then the other of said operating arms.

8. Drive mechanism comprising a pivoted arm, and means for pivoting said arm back and forth, said means including a pair of reciprocably movable operating arms each linked by a spring with said pivoted arm and each movable into retracted position to tension its corresponding spring and urge said pivot arm in reverse directions, latch means for each of said operating arms and operable to latch the same in retracted position, each said operating arm being operable as it moves toward retracted position to release the latch means of the opposite arm so that the latter will be urged out of retracted position by its corresponding spring, a pair of electrically operable members each operatively connected with one of said operating arms and each adapted when energized to move its respective arm into retracted position, together with switch means operable intermittently by said pivot arm as it swings back and forth to energize first one and then the other of said electrically operable members.

9. Drive mechanism comprising a pendulum, a pair of oppositely extended spring members attached to said pendulum and adapted when tensioned to urge the pendulum in opposite directions, a pair of oppositely reciprocable operating arms to each of which is attached one of said spring members and each arm being retractable to tension its respective spring member and swing the pendulum, latch members automatically engageable with each of said arms for holding the same in retracted position, each one of said arms, when it is retractably moved, operatively engaging the latch member of the other arm, to release said other arm for movement out of retracted position, each of said arms having electro-magnetic retracting means and switch means therefor operable by said pendulum once during each cycle of operation of the pendulum.

10. An electro-mechanical drive mechanism including a swinging arm, means for limiting the amplitude of swing of the arm, mechanism for alternately urging said arm in opposite directions, said mechanism including tension means attached to said arm and alternately tensionable in divergent directions to move said arm correspondingly, switch means adjacent the opposite limits of the swing of said arm and alternately operable by the same as it swings back and forth, electrical means periodically operable by said switch means for tensioning said tension means in alternate directions as aforesaid, and automatic mechanism for holding said tension means tensioned to move said arm in a given direction for a determined length of time during each cycle of movement of the swinging arm.

11. Mechanism including a drive member pivoted between its extremities and arranged for oscillatory movement, means for counter-balancing said member, a pair of oppositely extended spring members attached to said drive member and each adapted when tensioned to urge said member in opposite pivotal directions, a pair of oppositely reciprocable arms each having one of said spring members attached thereto and each being movable in a direction away from the other into retracted position to tension its corresponding spring member, automatic latch mechanism for holding said arms in retracted position and operable to release a latched and retracted arm when the opposite arm of the pair is retracted, electrically operable retracting means for said arms, and switch means operable by said drive member to energize said electrical means and alternately retract said operating arms whereby said drive member may be caused to oscillate back and forth.

NATHEN E. SQUIRE.